Feb. 7, 1928.  1,658,594
T. L. FEENEY ET AL
DOWSER CLOSING MECHANISM FOR MOTION PICTURE PROJECTING MACHINES
Filed Dec. 20, 1926   3 Sheets-Sheet 2

WITNESSES:

INVENTORS.
Thomas Lewis Feeney &
Humbert Godoy,
BY
Joshua R. H. Potts
ATTORNEY.

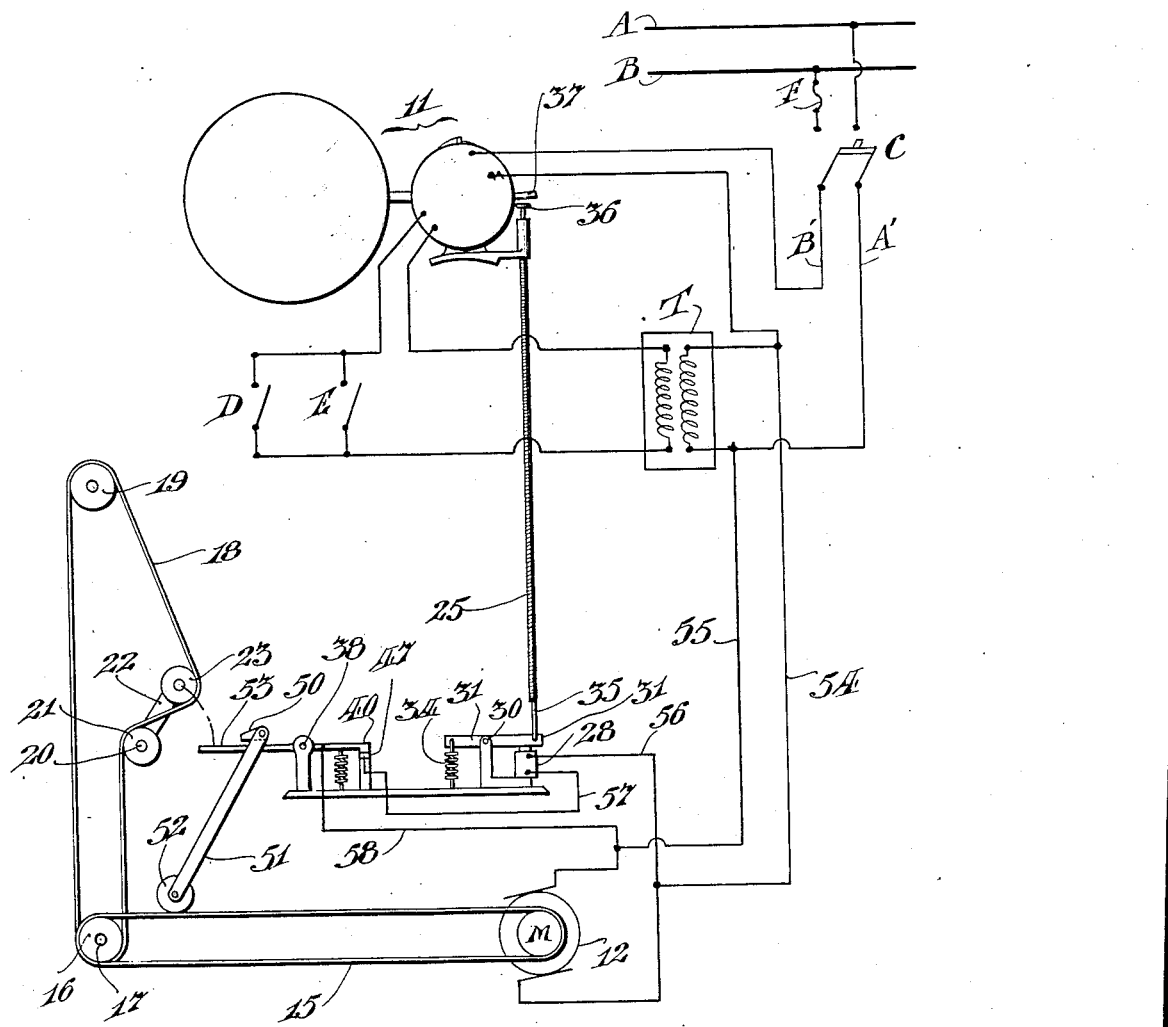

Patented Feb. 7, 1928.

1,658,594

UNITED STATES PATENT OFFICE.

THOMAS LEWIS FEENEY AND HUMBERT GODOY, OF PHILADELPHIA, PENNSYLVANIA, ASSIGNORS, BY MESNE ASSIGNMENTS, TO SENTRY SAFETY CONTROL CORPORATION, OF PHILADELPHIA, PENNSYLVANIA.

DOWSER-CLOSING MECHANISM FOR MOTION-PICTURE-PROJECTING MACHINES.

Application filed December 20, 1926. Serial No. 155,779.

Our invention relates to safety devices for motion picture projectors and more particularly to means for automatically intercepting the rays of light passing through the film in case the film feeding mechanism ceases to function.

It is a well known fact that, if the motion picture film ceases to move through the path of the light rays, the intense heat from the lamp will cause the film to explode. In Patent No. 1,618,417, issued to us on February 22, 1927, we have described a device for intercepting the rays of light between the lamp and the film and for automatically stopping the motor, in case the film breaks at any point.

Should the mechanism which moves the film feeding mechanism be stopped for any cause, such as the blowing of a fuse or the breaking of a belt, the film would remain stationary in the path of the light rays and would explode from the intense heat.

The object of this invention is to provide novel mechanism which when the belt breaks or when the motor circuit is broken will operate to close the dowser to obstruct the rays of light and thus protect the film.

A further object of the invention is to provide a device which may be readily mounted on a motion picture projector and which will utilize the operation of certain moving parts of such machine.

Figure 1:
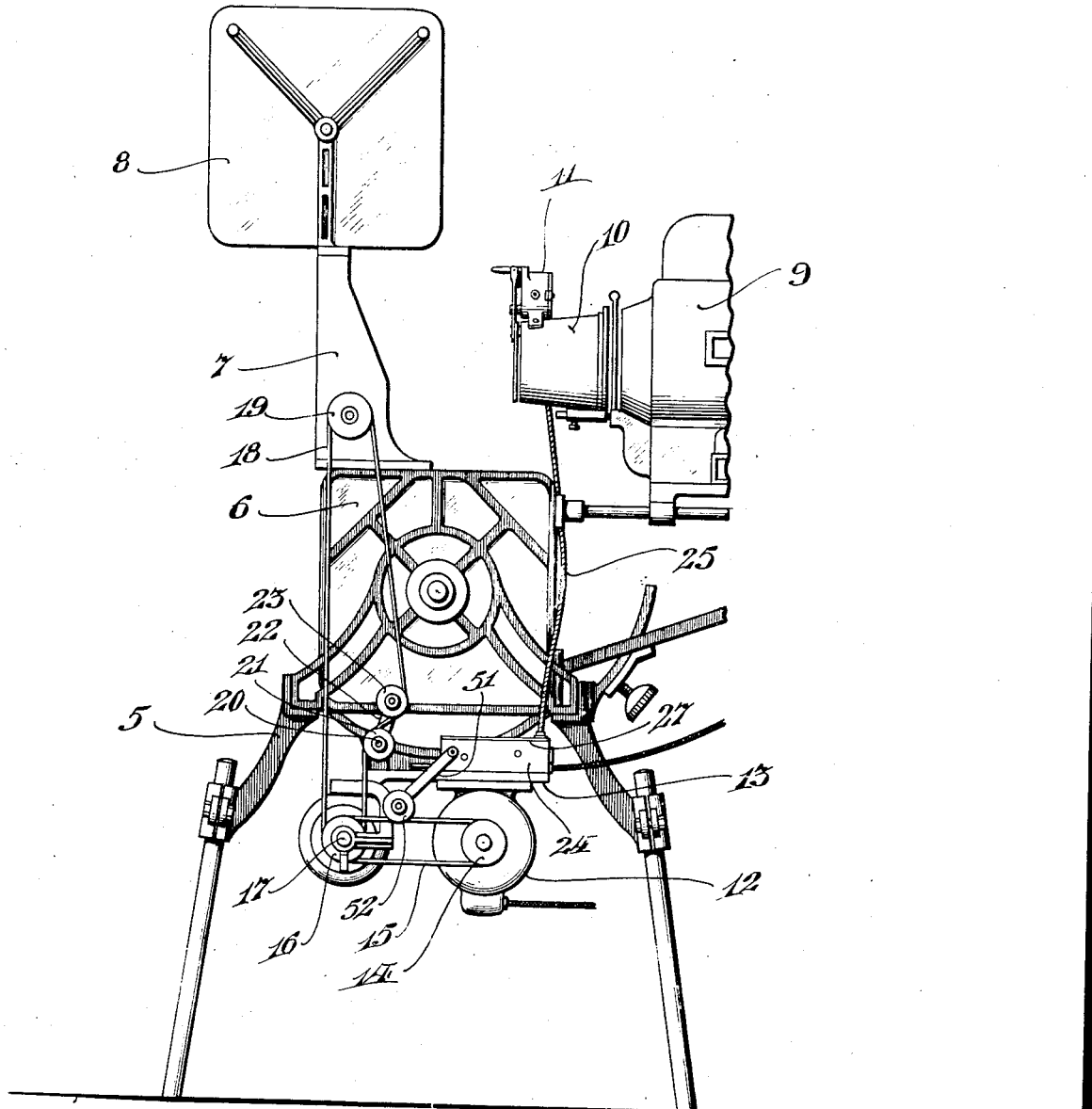

These objects, and other advantageous ends which will be described hereinafter, we attain in the following manner, reference being had to the accompanying drawings in which Figure 1 is a fragmentary side view of a motion picture projector on which both our new invention and the device described in Patent No. 1,618,417 are installed.

Figure 2:
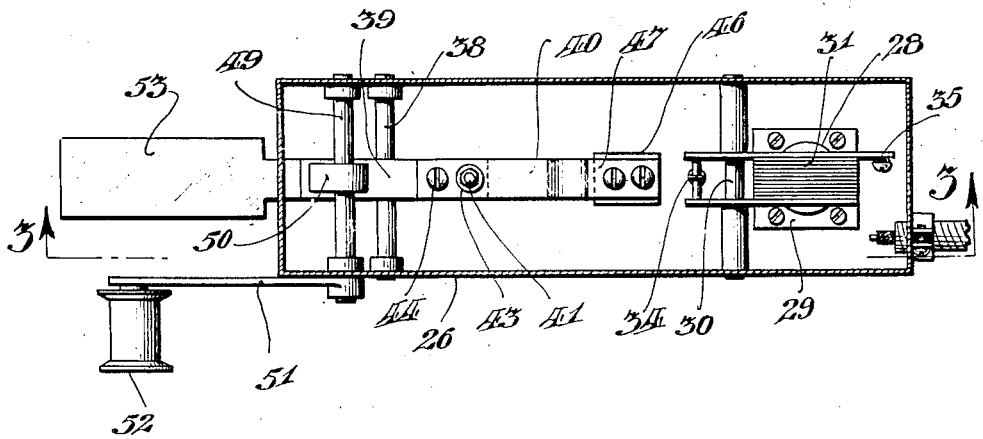
Figure 3:
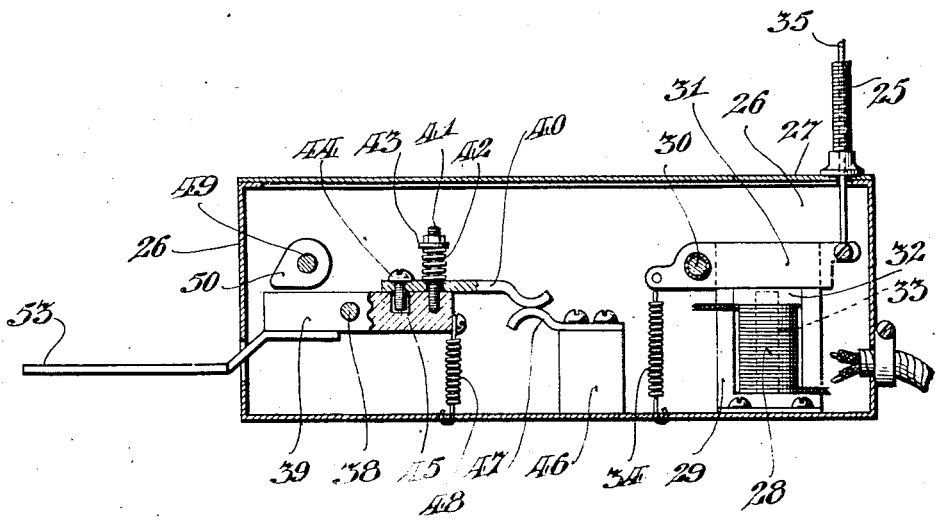

Figure 2 is a top plan view of the main unit of our device with the casing cover removed and the casing walls shown in section, Figure 3 a section on line 3—3 of Figure 2, certain parts being broken away, and Figure 4 a combined wiring diagram and diagrammatic view showing the operation of our device.

Referring now more particularly to Figure 1, the projecting machine consists of a main frame 5 carrying a reel case 6 above which is mounted a film feeding mechanism frame 7, on top of which the film magazine 8 is mounted. A lamp 9 is mounted on the machine so that its cone 10 is directed toward the aperture in frame 7 through which the pictures are projected onto the screen. A safety device 11 is mounted on cone 10 and is similar to the device described in Patent No. 1,618,417.

A motor 12 is mounted on the under side of a base plate 13 forming a part of main frame 5 and has a pulley 14 rigidly secured to its armature shaft. A belt 15 connects pulley 14 to a pulley 16 mounted on a jack shaft 17 forming a part of the speed control mechanism of the projecting machine. A driving pulley (not shown) is also mounted on jack shaft 17 and is connected by means of a belt 18 to a pulley 19 which operates the projecting mechanism in frame 7.

One side of belt 18 is engaged by a deflector sheave 21 rotatably mounted on a stub shaft 20 secured in main frame 5. An arm 22 is rotatably mounted on shaft 20 and carries a roller 23 on its outer end which tends to bend belt 18 over sheave 21, due to a suitable spring arrangement, and keeps the belt taut. With exception of safety device 11, all of the elements so far described are parts of a standard motion picture projector and form no part of our invention. The main unit 24 of our device is mounted on the upper side of base plate 13 and has one end of a flexible conduit 25 secured to the cover 27 of its casing 26; the other end of the conduit being suitably connected adjacent safety device 11 as shown in Figure 4.

Referring now to Figures 2 and 3, an electromagnet 28 is mounted in an iron frame 29 secured to the bottom of casing 26. A shaft 30 is mounted through the sides of casing 26 and has an armature 31 hinged thereon and adapted to rest upon the upper end of magnet frame 29. A non-metallic disk 32 is placed above magnet 28 and has an aperture through its center to accommodate magnet core 33 which extends beyond the end of magnet 28 but is slightly spaced from the bottom of armature 31.

A spring 34 has one end connected to one end of the frame of armature 31 and has its other end connected to the bottom of casing 26, thus tending to draw the end of the frame downwardly and raise armature 31 away from magnet frame 29. A spring wire 35 has one end rigidly connected to the other end of the frame of armature 31, extends upwardly through conduit 25 and terminates in a button 36 disposed immediately beneath a trip arm 37, forming a part of safety device 11.

A shaft 38 is mounted in casing 26 and has a lever 39, made of insulating material, rockably mounted thereon. A contact 40 is yieldingly secured to one end of lever 39 by means of a stud 41 threaded into the lever and encircled by a spring 42 disposed between the top of contact 40 and a washer 43 held near the top of the stud by a suitable nut. A screw 44 is threaded through the rear end of contact 40 and is slidable in a recess 45 formed in lever 39 to prevent rotation of the contact and also to provide a binding post for the wire 56. A bracket 46, made of insulating material, is secured to the bottom of casing 26 and a contact 47 secured to same makes contact with the contact 40. A tension spring 48 has one end connected to lever 39 and its other end connected to the bottom of casing 26 and tends to hold contact 40 firmly against contact 47 and, by acting against the tension of spring 42, absorbs the vibrations of the machine.

A shaft 49 is revolubly mounted in casing 26 and has a cam 50 fixed near its center adapted to engage the upper side of lever 39, cause same to rock on shaft 38 and raise contact 40 above contact 47. A lever arm 51 is rigidly connected to the outer end of shaft 49 and has a roller 52 rotatably mounted on its outer end. An extension 53 is secured to lever 39 and extends outwardly through a suitable aperture in casing 26.

Referring now to Figure 4, the wires A and B represent the motor feed circuit and are connected by the switch C to wires A' and B'. Wire B' is connected to one side of a switch in safety device 11 and a wire 54 connects the other side of this switch to one side of motor 12. The other side of motor 12 is connected to wire A' by a wire 55, thus furnishing power to the motor.

One end of the primary coil of a transformer T is connected to wire 55 and the other end to wire 54, thus putting the transformer in parallel with motor 12. The secondary coil of transformer T is connected to an electromagnet in safety device 11 which is adapted to actuate this device when this circuit is closed by either of the switches D or E, as described in Patent No. 1,618,417.

A wire 56 connects one terminal of electromagnet 28 to wire 54 and a wire 57 connects its other terminal with contact 47. A wire 58 connects contact 40 with wire 55, thus connecting electromagnet 28 in parallel with motor 12 and allowing a current to flow from wire A, through switch C, wire A', wire 55, wire 58, contacts 40 and 47, wire 57, electromagnet 28, wire 56, wire 54, the switch in safety device 11, wire B', and switch C to power wire B, thus energizing magnet 28 which will hold armature 31 firmly against the top of frame 29.

Referring now to all the views simultaneously, it will be noted that roller 52 is supported by the upper side of belt 15. In case this belt breaks, roller 52 would swing ownwardly and force cam 50 against lever 39 and raise contact 40 away from contact 47, thus breaking the circuit through electromagnet 28 and de-energizing same; thus allowing spring 34 to rock armature 31 on shaft 30 and force wire 35 upwardly until button 36 engages trip arm 37 and actuates safety device 11, causing the dowser plate to swing downwardly and intercept the rays of light passing through the film.

Should belt 18 break, roller 23 will be allowed to swing outwardly and downwardly so that it would strike extension 53 and cause lever 39 to rock on shaft 38; thus breaking the contact between points 40 and 47 and causing safety device 11 to operate as above described. The motor circuit is provided with a fuse F and, should this fuse blow, the magnet 28 will be de-energized and the safety device caused to operate.

When the weight of either roller 23 or 52 is removed from lever 39, spring 48 tends to jerk contact 40 against contact 47. The blow thus produced is softened by the action of spring 42 while screw 44 prevents contact 40 from rotating.

With our invention installed on a motion picture projector, it is evident that all danger of the film exploding, due to the stopping of the film feeding mechanism, is eliminated. The parts added to the regular equipment of the machine are few and simple, the device is positive in action and requires no attention.

Of course the dowser closing mechanism illustrated may be modified in various ways without departing from the invention herein set forth and hereafter claimed.

We claim:

1. In a motion picture projecting machine having film feeding mechanism, belting for the same, and a safety device comprising a dowser and a trip arm for releasing the dowser, a spring actuated shaft tending to actuate said trip arm, electrical means for holding said shaft against the action of the spring, and means released by the breaking of a belt or failure of electric current for releasing said shaft to operate said trip arm.

2. In a motion picture projecting machine having film feeding mechanism, belting for the same, and a safety device comprising a dowser and a trip arm for releasing said dowser, means for tripping the arm, a spring urging said last means against said trip arm, electrical means for holding said last means against the action of the spring, and means operated by the breaking of a belt for opening the electrical circuit to permit said spring to operate said tripping means.

3. In a device of the class described, an electromagnet, an armature hinged above the magnet and held in its lowermost position by the attraction of the magnet, a flexible shaft secured to the armature, a spring tending to move the shaft upwardly, an electrical circuit for supplying current to the magnet, and a pair of contacts in the circuit, whereby separating the contacts will deprive the magnet of its power and allow the spring to move the shaft upwardly.

4. In a device of the class described, an electromagnet, an armature hinged above the magnet and held in its lowermost position by the attraction of the magnet, a flexible shaft secured to the armature, a spring tending to move the shaft upwardly, a fixed contact, a rockable contact, spring means tending to hold the contacts together, resilient means for cushioning the effect of said spring means, and wires connecting said contacts and said electromagnet to a source of electric power, whereby separation of the contacts or failure of the power will allow said spring to move the flexible shaft upwardly.

5. In combination with a motion picture projector having a motor, a belt and a safety device adapted to intercept the rays of light passing through the machine; means for actuating the safety device including a flexible shaft; a spring tending to move the shaft upwardly and actuate the safety device; an electromagnet tending to hold the shaft against upward movement; a fixed contact; a rockable contact engaging the fixed contact; wires connecting the contacts and electromagnet to a source of power to form a circuit; and means engaging the belt and adapted to separate the contacts upon the breaking of the belt, whereby the magnet will be de-energized and allow the spring to move the shaft upwardly.

6. In combination with a motion picture projector having a motor, a belt and a safety device adapted to intercept the rays of light passing through the machine; means for actuating the safety device including a flexible shaft; a spring tending to move the shaft upwardly and actuate the safety device; an electromagnet tending to hold the shaft against upward movement; a fixed contact, a rockable contact engaging the fixed contact; wires connecting the contacts and electromagnet into a circuit; said circuit being connected to the source of power supplying current to the motor; and means engaging the belt and adapted to separate the contacts upon the breaking of the belt, whereby the separating of the contacts or interruption of current to the motor will de-energize the magnet and allow the spring to move the shaft upwardly.

7. In combination with a motion picture projector having a motor, a belt and a safety device adapted to intercept the rays of light passing through the machine; means for actuating the safety device including a flexible shaft; a spring tending to move the shaft upwardly and actuate the safety device; an electromagnet tending to hold the shaft against upward movement; a fixed contact; a rockable contact engaging the fixed contact; wires connecting the contacts and electromagnet to a source of power to form a circuit; an arm secured to the rockable contact; a roller supported by the belt and adapted to engage the arm and separate the contacts upon the breaking of the belt, whereby the magnet will be de-energized and allow the spring to move the shaft upwardly.

8. In combination with a motion picture projector having a motor circuit and a safety device having a dowser and a trip arm for releasing the dowser, means for actuating the safety device including tripping means adjacent the trip arm, a spring tending to move the tripping means against the trip arm, and an electro-magnet electrically connected with the motor circuit for holding the tripping means against the action of the spring, whereby failure of power to the motor will cause the magnet to be deenergized and allow the spring to move the tripping means against the trip arm and release the dowser.

9. In combination with a motion picture projector having a belt for driving the film moving mechanism and a safety device having a trip adapted to release a dowser and allow same to swing into the path of the rays of light passing through the film, means for actuating said safety device including tripping means adjacent the trip arm, a spring tending to move the tripping means against the trip arm, an electro-magnet holding the tripping means against the action of the spring, an electrical circuit for energizing the magnet, a switch in said circuit, and means coacting with the belt for opening the switch should the belt break whereby the magnet will be deenergized and the spring allowed to move the tripping means against the trip arm and release the dowser.

10. In combination with a motion picture projector having a motor circuit and a belt for driving the film moving mechanism and a safety device having a trip adapted to release a dowser and allow same to swing into the path of the rays of light passing through the film, means for actuating said safety device including tripping means adjacent the trip arm, a spring tending to move the tripping means against the trip arm, an electro-magnet electrically connected with the motor circuit for holding the tripping means against the action of the spring, a switch in the motor circuit, a roller resting against the belt and adapted to open the switch should the belt break whereby the magnet will be deenergized and the spring allowed to move the tripping means against the trip arm and release the dowser.

11. In combination with a motion picture projector having a motor circuit and a belt for driving the film moving mechanism and a safety device having a trip adapted to release a dowser and allow same to swing into the path of the rays of light passing through the film, means for actuating said safety device including a support, a magnet armature having one end hinged to the support, a spring tending to move the other end of the armature away from the support and cause it to trip the trip arm, an electromagnet electrically connected with the motor circuit for holding the armature against the action of the spring, a switch in the motor circuit, and means coacting with the belt for opening the switch should the belt break, whereby the breaking of a belt or failure of power to the motor will cause the magnet to be deenergized and the spring allowed to swing the armature and cause the trip arm to be actuated.

In testimony whereof we have signed our names to this specification.

THOMAS LEWIS FEENEY.
HUMBERT GODOY.